(12) United States Patent
Andrade Silva et al.

(10) Patent No.: US 11,200,453 B2
(45) Date of Patent: Dec. 14, 2021

(54) INFORMATION PROCESSING SYSTEM, AN INFORMATION PROCESSING METHOD AND A COMPUTER READABLE STORAGE MEDIUM

(71) Applicant: NEC Corporation, Tokyo (JP)

(72) Inventors: Daniel Georg Andrade Silva, Tokyo (JP); Yotaro Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 659 days.

(21) Appl. No.: 16/078,697

(22) PCT Filed: Feb. 29, 2016

(86) PCT No.: PCT/JP2016/001076
§ 371 (c)(1),
(2) Date: Aug. 22, 2018

(87) PCT Pub. No.: WO2017/149559
PCT Pub. Date: Sep. 8, 2017

(65) Prior Publication Data
US 2021/0192277 A1 Jun. 24, 2021

(51) Int. Cl.
*G06K 9/62* (2006.01)
*G06N 3/04* (2006.01)
(52) U.S. Cl.
CPC ........... *G06K 9/6256* (2013.01); *G06K 9/627* (2013.01); *G06K 9/6215* (2013.01); *G06N 3/0427* (2013.01); *G06N 3/0454* (2013.01)
(58) Field of Classification Search
CPC ................ G06K 9/6256; G06K 9/6215
See application file for complete search history.

(56) References Cited

U.S. PATENT DOCUMENTS

2016/0321522 A1* 11/2016 Yuan .................... G06N 3/0454

OTHER PUBLICATIONS

Communication dated Aug. 20, 2019, from the Japanese Patent Office in counterpart Application No. 2018-560270.
Masashi Tsubaki et al., "Multilayer nonlinear similarity learning using semantic configuration by neural network and kernel embedding", IPSJ SIG Technical Report, Jul. 8, 2015, No. 2015-NL-222, vol. 5, pp. 1-12 (12 pages total).
(Continued)

*Primary Examiner* — Tuan H Nguyen
(74) *Attorney, Agent, or Firm* — Sughrue Mion, PLLC

(57) ABSTRACT

An information processing system for improving detection of a relation between events is provided. A learning system (100) includes a training data storage (120) and a learning module (130). The training data storage (120) stores a training pair of a first and second event, and a relation between the training pair of the first and second events. The relation is a first or second relation. The learning module 130 learns a neural network for classifying a relation between a pair of the first and second events to be classified as the first or second relation, by using the training pair. The neural network includes a first layer to extract a feature of the first relation from features of the first and second events, a second layer to extract a feature of the second relation from the features of the first and second events, and a joint layer to extract a joint feature of the first and second relations from the features of the first and second relations.

7 Claims, 8 Drawing Sheets

(56) References Cited

OTHER PUBLICATIONS

Teranaka et al., "Application of vector space in implication relationship recognition", The Association for Natural Language Processing, 21th Annual Meeting, Publication Paper, Mar. 9, 2015, pp. 924-927 (4 pages total).

Ion Androutsopoulos, et al., "A Survey of Paraphrasing and Textual Entailment Methods", Journal of Artificial Intelligence Research, 2010, pp. 135-187, vol. 38 (53 pages total).

Tushar Khot, et al., "Markov Logic Networks for Natural Language Question Answering", arXiv, Jul. 10, 2015 (7 pages total).

Bing Bai, et al., "Supervised Semantic Indexing", Proceedings of the 18th ACM conference on Information and knowledge management, 2009, pp. 187-196 (10 pages total).

Ashutosh Modi, et al., "Inducing Neural Models of Script Knowledge", Proceedings of the Eighteenth Conference on Computational Language Learning, 2014, pp. 49-57 (9 pages total).

Ronan Collobert, et al., "Natural Language Processing (Almost) from Scratch", Journal of Machine Learning Research, 2011, pp. 2493-2537, vol. 12 (45 pages total).

Mark Granroth-Wilding, et al., "What Happens Next? Event Prediction Using a Compositional Neural Network Model", Proceedings of the Thirtieth AAAI Conference on Artificial Intelligence, 2016, pp. 2727-2733 (7 pages total).

Christiane Fellbaum, "English Verbs as a Semantic Net", International Journal of Lexicography, 1990, pp. 278-301, vol. 3, No. 4 (24 pages).

Amanda J.C. Sharkey, "Combining Artificial Neural Nets, Ensemble and Modular Multi-Net Systems", Jun. 26, 1998, p. 6, line 1-p. 7, last line, figures 1.1 and 1.2, XP002441332, http://citeseer.ist.psu.edu/438101.html (29 pages total).

Hyun Woo Do, et al., "Temporal Relation Classification with Deep Neural Network", International Conference on Big Data and Smart Computing, Jan. 18, 2016, pp. 454-457, abstract, p. 455, left-hand column, line 3-p. 456, left-hand column, last line, XP032877111 (4 pages total).

Yan Xu, et al., "Improved Relation Classification by Deep Recurrent Neural Networks with Data Augmentation", Proceedings of Coling 2016, the 26th International Conference on Computational Linguistics: Technical Papers, 2016, pp. 1461-1470, XP080678970 (10 pages total).

Zhongping Liang, et al., "Recognition of Person Relation Indicated by Predicates", Spring International Publishing, Oct. 20, 2015, pp. 313-324, XP047324427 (12 pages total).

\* cited by examiner

Fig.5

TRAINING DATA

[(Peter, buy, car) $\Rightarrow_t$ (Peter, sell, car)]

$\vdots$

[(Peter, buy, car) $\Rightarrow_s$ (Peter, acquire, car)]

$\vdots$

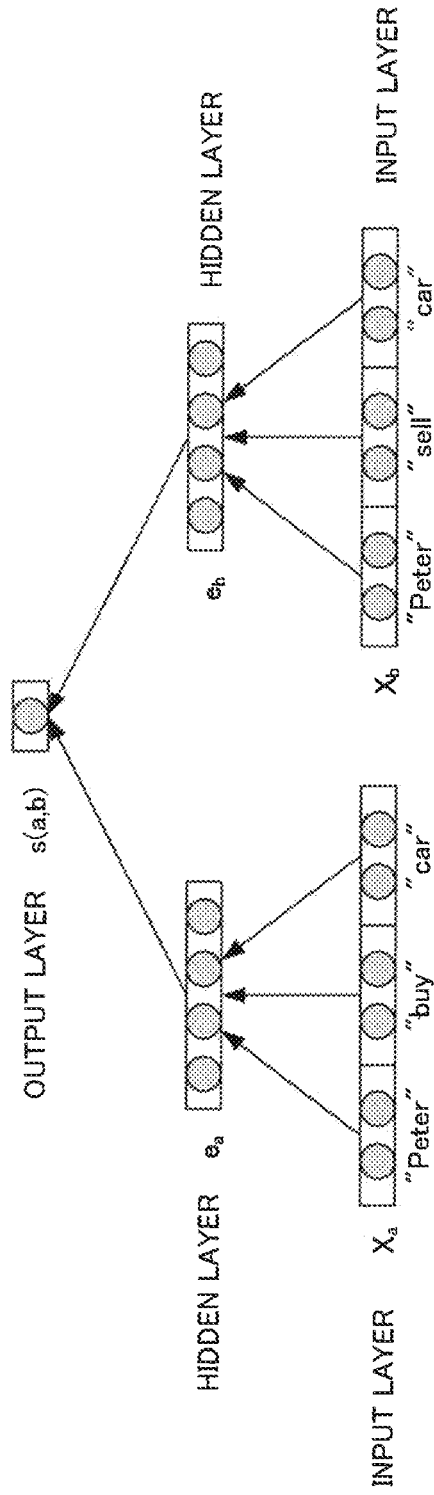

INFORMATION PROCESSING SYSTEM, AN INFORMATION PROCESSING METHOD AND A COMPUTER READABLE STORAGE MEDIUM

This application is a National Stage Entry of PCT/JP2016/001076 filed on Feb. 29, 2016, the contents of all of which are incorporated herein by reference, in their entirety.

TECHNICAL FIELD

The present invention relates to an information processing system, an information processing method and a computer readable storage medium thereof.

Background Art

In a logic-based reasoning engine, an implication measure between two events is used for reasoning. Events are represented as a predicate argument structure. Assuming an event is simply defined as an expression or sentence that contains only one verb, the event can be represented as a predicated argument structure (PAS). For example, an event "Peter was attacked by a dog" is represented by verb="attack", arg0="dog", and arg1="Peter", where arg0 refers to a semantic subject and arg1 refers to a semantic object. In the following, the event is also represented as (dog, attack, Peter) using the predicated argument structure.

For the logic-based reasoning engine, there are roughly three main applications of the implication measure between events.

1) Overcoming lexical variations. For example, assume that, in a background knowledge base (BK), an event "car drives" is defined, however, in an input, an observation "automobile drives" is stated. In this case, the event "automobile drives" is one of the lexical variations of the event "car drives". Then it is inferred that "automobile drives" implies "car drives" ("automobile drives"=>"car drives"). Here the symbol "=>" indicates that an event at the left side of the symbol implies an event at right side of the symbol.

2) Finding entailment relations. For example, assume that, in a BK, an event "Peter goes home" is defined, however, in an input, an observation "Peter limps home" is stated. In this case, the event "Peter limps home" implies the event "Peter goes home". Then it is inferred that "Peter limps home" implies "Peter goes home" ("Peter limps home"=>"Peter goes home").

3) Finding temporal relations. For example, assume that, in a BK, an event "car drives" is defined, however, in an input, an observation "driver enters car" is stated. In this case, the event "car drives" occurs after the event "driver enters car". Then it is inferred that "driver enters car" implies "car drives" ("driver enters car"=>"car drives").

The first and second applications are, for example, realized by using existing synonym dictionaries as described in NPL2, and this way improve the robustness of the logical reasoning system. In more general, these applications are realized by a textual entailment system in NPL1.

The third application is partly addressed by script learning in NPL4. In NPL4, temporal (before-after) order like {"sitting down in restaurant"=>"order mean"} is detected.

Note that, as a related technology, NPL 3 discloses a method for learning a model to detect semantically matching between text documents. NPL5 discloses a neural network architecture using a convolution layer. NPL6 discloses an event prediction using a neural network.

CITATION LIST

Non Patent Literature

[NPL 1]
Ion Androutsopoulos, et al., "A Survey of Paraphrasing and Textual Entailment Methods", Journal of Artificial Intelligence Research, Vol. 38, pp. 135-187, 2010.
[NPL 2]
Tushar Khot, et al., "Markov Logic Networks for Natural Language Question Answering", arXiv, 2015.
[NPL 3]
Bin Bai, et al., "Supervised Semantic Indexing", Proceedings of the 18th ACM conference on Information and knowledge management, pp.187-196, 2009.
[NPL 4]
Ashutosh Modi, et al., "Inducing Neural Models of Script Knowledge", Proceedings of the Eighteenth Conference on Computational Language Learning, pp.49-57, 2014.
[NPL 5]
Ronan Collobert, et al., "Natural Language Processing (almost) from Scratch", Journal of Machine Learning Research, Vol. 12, pp.2493-253'7, 2011.
[NPL 6]
Mark Granroth-Wilding, et al., "What Happens Next? Event Prediction Using a Compositional Neural Network", Proceedings 13th AAAI
[NPL 7]
Fellbaum, Christiane "English Verbs as a Semantic Net", International Journal of Lexicography, Vol. 3, Issue 4, pp.278-301, 1990.

SUMMARY OF INVENTION

Technical Problem

In the NPLs described above, the two types of implication, temporal and entailment are treated as independent tasks. As a consequence, training data for detecting a temporal relation and training data for detecting an entailment relation cannot be combined for machine learning. In particular, if there is insufficient training data for the temporal relation detection available, then a machine learning method does not perform well.

An object of the present invention is to resolve the issue mentioned above. Specifically, the object is to provide an information processing system, an information processing method and a computer readable storage medium thereof which improve detection of a relation between events.

Solution to Problem

An information processing system according to an exemplary aspect of the invention includes: a training data storing means for storing a training pair of a first and second event, and a relation between the training pair of the first and second events, the relation being a first or second relation; and a learning means for learning a neural network for classifying a relation between a pair of the first and second events to be classified as the first or second relation, by using the training pair, the neural network including a first layer to extract a feature of the first relation from features of the first and second events, a second layer to extract a feature of the second relation from the features of the first and second events, and a joint layer to extract a joint feature of the first and second relations from the features of the first and second relations.

An information processing method according to an exemplary aspect of the invention includes: reading out a training pair of a first and second event, and a relation between the training pair of the first and second events, the relation being a first or second relation; and learning a neural network for classifying a relation between a pair of the first and second events to be classified as the first or second relation, by using the training pair, the neural network including a first layer to extract a feature of the first relation from features of the first and second events, a second layer to extract a feature of the second relation from the features of the first and second events, and a joint layer to extract a joint feature of the first and second relations from the features of the first and second relations.

A computer readable storage medium according to an exemplary aspect of the invention records thereon a program, causing a computer to perform a method including: reading out a training pair of a first and second event, and a relation between the training pair of the first and second events, the relation being a first or second relation; and learning a neural network for classifying a relation between a pair of the first and second events to be classified as the first or second relation, by using the training pair, the neural network including a first layer to extract a feature of the first relation from features of the first and second events, a second layer to extract a feature of the second relation from the features of the first and second events, and a joint layer to extract a joint feature of the first and second relations from the features of the first and second relations.

Advantageous Effects of Invention

An advantageous effect of the present invention is improving detection of a relation between events.

BRIEF DESCRIPTION OF DRAWINGS

FIG. 5 is a diagram illustrating an example of training data in the first exemplary embodiment of the present invention.

FIG. 8 is a diagram illustrating a neural network to detect a temporal relation based on the neural network proposed in NPL4.

DESCRIPTION OF EMBODIMENTS (Preliminaries)

Figure 1:
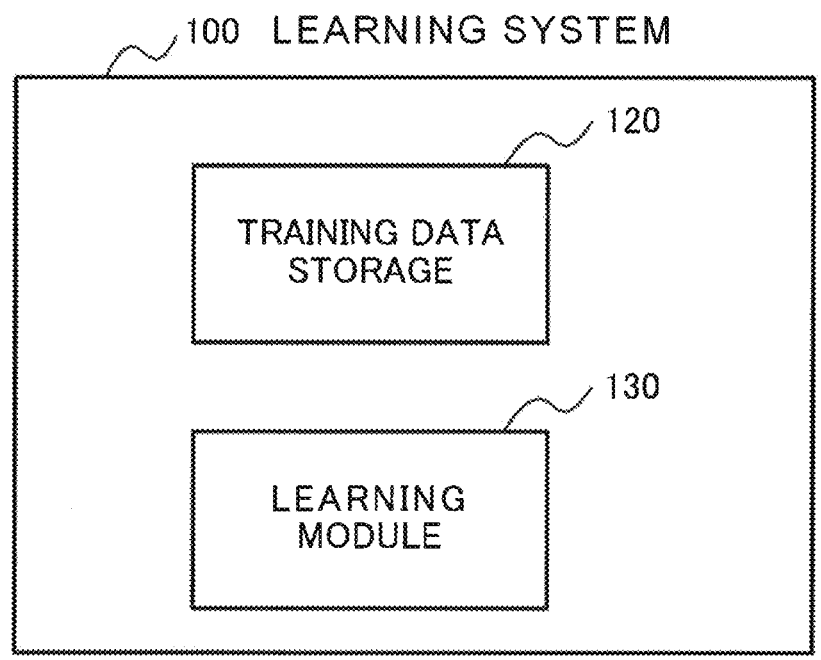
FIG. 1 is a block diagram illustrating a characteristic configuration of a first exemplary embodiment of the present invention.

First of all, preliminaries used in a first embodiment and a second embodiment will be described below.

In the simplest setting, it is assumed that training data contains training pairs of events given in the form {"a"=>"b"}, where "a" and "b" denote two single events. An event may be represented as a predicate argument structure, or a neo-davidsonian event representation. In the form {"a"=>"b"}, the event "a" is also referred to as an observed event or a first event, and the event "b" is also referred to as a predicted event or a second event.

Let V be vocabulary which contains all words, and assume that a feature vector is given for all words in V. The feature vector may be defined by a bag-of-words, where the feature vector has dimension s which is the number of words in the vocabulary. The feature vector may also be defined by a word embedding disclosed in NPL1. The word embedding is learned for each word in V.

First, a feature vector representation for each event is created.

One possible way to create the feature vector representation of an event is to sum a feature vector for the predicate and feature vectors for all of the arguments as expressed by Math. 1. In Math. 1, $x_a$ is a feature vector for event "a", $x_{a,i}$ is a feature vector for the i-th word of the event, and k is the number of words in the event.

$$x_a := \sum_{i=0}^{k} x_{a,i} \quad \text{[Math. 1]}$$

Another possible way to create the feature vector representation of the event is using a convolution neural network as disclosed in NPL 5, or finding an event representation using auto-encoder as disclosed in NPL 6 to summarize the event into a fixed length vector.

Assuming that k is fixed, still another possible way to create the feature vector representation of the event is to append the feature vectors of respective words to one long feature vector as expressed by Math. 2.

$$x_a := [x_{a,0}, x_{a,1}, \ldots, x_{a,k}] \quad \text{[Math. 2]}$$

In the following, for simplicity, it is assumed that k is fixed to 2, and $x_{a,0}$, $x_{a,1}$, and $x_{a,2}$ correspond to the feature vector of a semantic subject, predicate, and semantic object, respectively. For example, in an event "Peter kisses Sara", the predicate is "kisses", the subject is "Peter" and the object is "Sara".

Furthermore, in the following, it is assumed that $x_{a,0}$, $x_{a,1}$, and $x_{a,2}$ are expressed by their word embeddings like word2vec. Moreover, for simplicity, it is assumed that the subject and object in both events are the same (same surface form) and refer to the same entities. For example, with respect to the pair of events (Peter, buy, car) and (Peter, sell, car), "Peter" in both events refer to the same person, and "car" refers to the same car. It is also assumed each word embedding has dimension d.

In addition, it is assumed that an implication relation (also simply referred to as a relation) is able to be classified as two types: a temporal relation (also referred to as a before-after relation or a future prediction relation) or an entailment relation. The temporal relation is denoted by a symbol "=>$_t$". The symbol "=>$_t$" indicates that an event at the left side of the symbol occurs before an event at right side of the symbol. The entailment relation is denoted by a symbol "=>$_c$". The symbol "=>$_c$" indicates that an event at the left side of the symbol entails (logically implies) an event at right side of the symbol. Here, entailment and logical implication are considered as equivalent. It is noted that the temporal relation and the entailment relation are exemplary embodiments of a first relation and a second relation of the present invention, respectively.

For detecting temporal relations, a neural network disclosed in NPL4 is can be used. FIG. 8 is a diagram illustrating a neural network to detect the temporal relation based on the neural network proposed in NPL4. First, in hidden layers, event embeddings $e_a$, $e_b$, having dimension h are calculated by using Math. 3. In Math. 3, $M_a$ and $M_b$ are weight matrixes having dimension h x 3d and g is a non-linear function like sigmoid which is applied element-wise.

$$e_a = g(M_a x_a)$$

$$e_b = g(M_b x_b) \quad \text{[Math. 3]}$$

The resulting event embeddings $e_a$, $e_b$, are then used to calculate a score s(a,b) which indicates whether an event "a" occurs before an event "b", by using Math. 4. In Math. 4, $w_a$ and $w_b$ are weight vectors having dimension h.

$$s(a,b) = w_a^T e_a + w_b^T e_b \quad \text{[Math. 4]}$$

In particular, if s>0, then the event "a" is classified as occurring before the event "b", and otherwise the event "b" is classified as occurring before the event "a".

Consider the case that there is a training event pair p1:{(Peter, buy, car)=>$_t$(Peter, sell, car)} in the training data, and, at runtime, there is a test event pair p2: {(Peter, purchase, car)=> (Peter, sell, car)} to test whether a temporal relation is held. Since "buy" and "purchase" occur in similar contexts, it is expected that their word embeddings are also similar. As a consequence, the test event pair p2 will get a similar score as the training event pair p1, which results in the correct classification of the test event pair p2.

Next consider, at runtime, there is a test event pair p3: {(Peter, buy, car)=> (Peter, purchase, car)} to test whether a temporal relation is held. Since "buy" and "purchase" are synonyms, it holds that {(Peter, buy, car)=>$_e$ (Peter, purchase, car)}, but in general, {(Peter, buy, car)=>$_t$ (Peter, purchase, car)} does not hold, since if Peter has already bought a car, it is not expected that he will buy the same car again (It is assumed that the subject and object on the left hand side, refer to the same subject and object on the right hand side, i.e. the same person "Peter" and the same "car").

For classifying the test event pair p3, it is compared with the event pair p1 in the training data. Since the words for "sell" and "purchase" tend to occur in similar contexts (i.e. with similar subjects and objects), their word embeddings are similar. As a consequence, the test event pair p3 gets a similar score to the training event pair p1. As a result, the test event pair p3 is classified incorrectly as a temporal relation {(Peter, buy, car)=>$_t$ (Peter, purchase, car)}.

First Exemplary Embodiment

A first exemplary embodiment of the present invention will be described below.

It is observed that entailment relations actually complement to temporal relations. That is, an event pair cannot be both in an entailment and temporal relation at the same time. The following are examples of entailment relations: {"Peter buys book"=>$_e$ "Peter purchase book)"}, {"Peter kills John"=>$_e$ "Peter wounds John" }, and {"Peter cooks food"=>$_e$ "Peter prepares food"}. None of the above can be interpreted as a temporal relation. That is, the symbol "=>$_e$" cannot be replaced by the symbol "=>$_t$". Formally, this can be expressed as ("a"=>$_e$ "b")=>$_e$ ¬("a"=>$_t$ "b").

Note that even if event pairs having an entailment relation are used as negative training pairs for a temporal relation in the neural network shown in FIG. 8, it is not necessarily improve detection of the temporal relation. If there are much more event pairs having an entailment relation than event pairs having a temporal relation as training data, then the networks parameters specialize mostly on the event pairs having an entailment relation, and learning of the event pairs having a temporal relation is hardly effective. That is because the learning of the network's parameters is dominated by the event pairs having an entailment relation.

In the first exemplary embodiment of the present invention, a neural network that jointly classifies temporal relations and entailment relations is used, in order to overcome the drawbacks from the neural network shown in FIG. 8.

Figure 2:
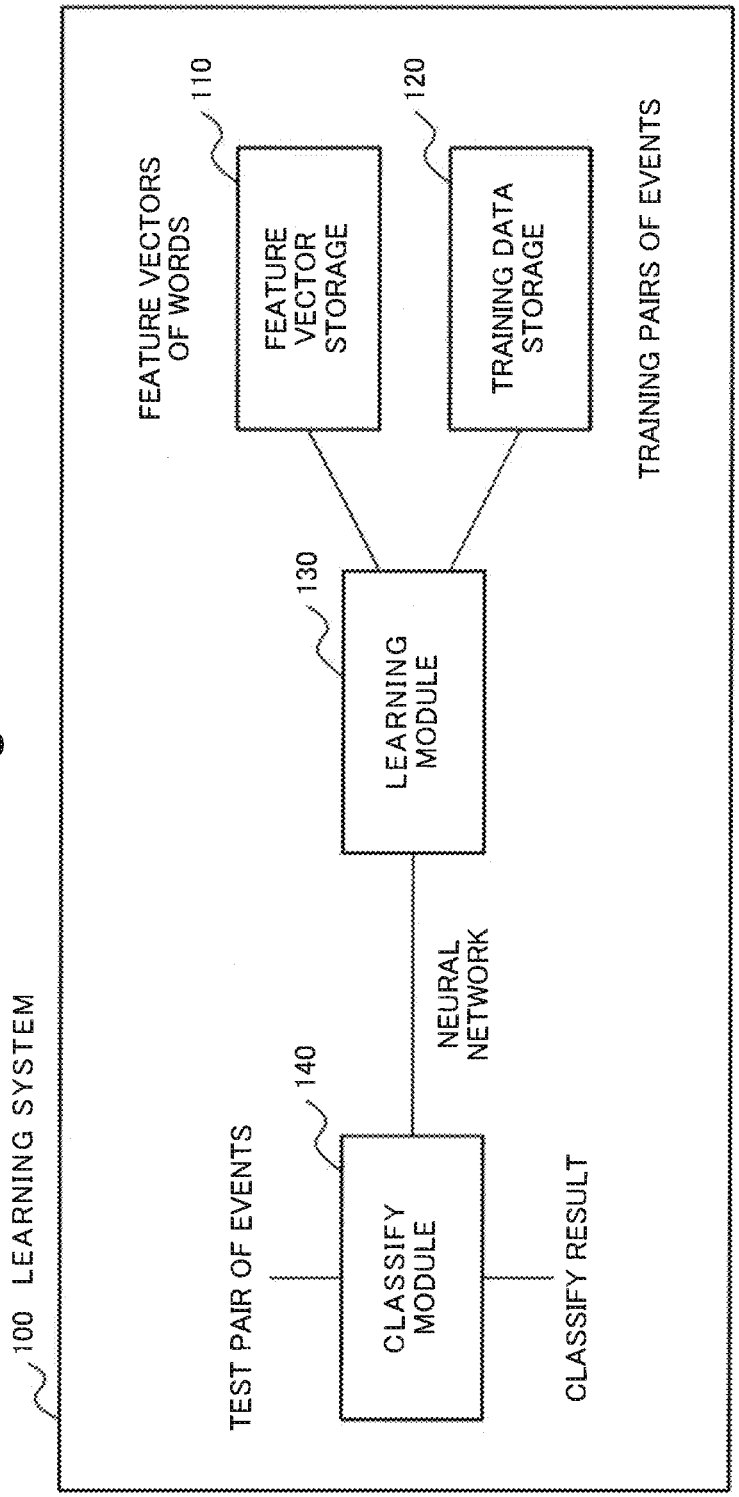
FIG. 2 is a block diagram illustrating a configuration of a learning system 100 in the first exemplary embodiment of the present invention.

A configuration of the first exemplary embodiment of the present invention will be described below. FIG. 2 is a block diagram illustrating a configuration of a learning system 100 in the first exemplary embodiment of the present invention. The learning system 100 is an exemplary embodiment of an information processing system of the present invention. With reference to FIG. 2, the learning system 100 in the first exemplary embodiment of the present invention includes a feature vector storage 110, a training data storage 120, a learning module (also referred to as a learning unit) 130, and a classify module (also referred to as a classify unit) 140.

The feature vector storage 110 stores feature vectors of respective words in vocabulary. The feature vector is defined by a word embedding, for example. The feature vector may be defined by bag-of-words or the other vector as long as it represents the feature of the word. The feature vectors are inputted from a user or the like and stored in the feature vector storage 110 beforehand.

The training data storage 120 stores pairs of events as training data (training pairs of events). FIG. 5 is a diagram illustrating an example of training data in the first exemplary embodiment of the present invention. In the example of FIG. 5, each piece of training data includes a pair of events and a type of an implication relation for the pair of events with the symbols "=>$_t$" (temporal relation) or "=>$_e$" (entailment relation). The training data is inputted from a user or the like and stored in the training data storage 120 beforehand.

The learning module 130 learns a neural network for classifying the implication relation between the events.

The classify module 140 performs classification of the implication relation for pairs of events to be classified (a test pairs of events).

The neural network of the first exemplary embodiment of the present invention will be described below.

Figure 6:
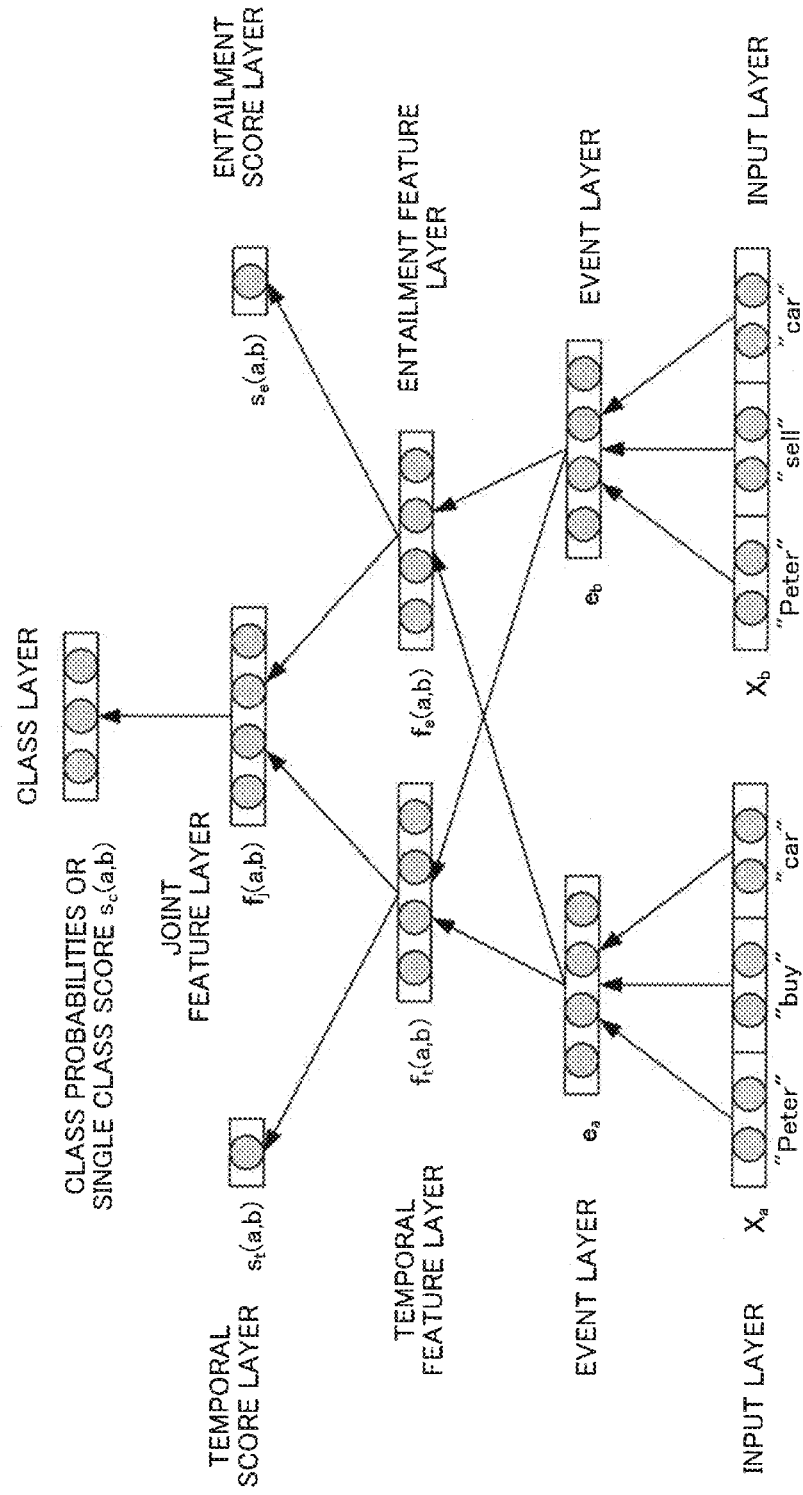
FIG. 6 is a diagram illustrating an example of a neural network in the first exemplary embodiment of the present invention.

The neural network specializes on both temporal relations and entailment relations and uses this knowledge to improve a temporal relation classification or an entailment relation classification by combining this knowledge for the final relation classifier. FIG. 6 is a diagram illustrating an example of the neural network in the first exemplary embodiment of the present invention. The neural network includes input layers, event layers, feature layers (also referred to as feature extractors), a joint feature layer (also referred to as a joint layer). As the feature layers, a temporal feature layer and an entailment feature layer are defined. The neural network further includes, as an output layer, a temporal score layer, an entailment score layer, and a class layer. It is noted that the temporal feature layer and the entailment feature layer are exemplary embodiments of a first layer and a second layer of the present invention, respectively.

The input layers are the same as the input layers of the neural network in FIG. 8. The input layers respectively receives inputs of feature vectors $x_a$, $x_b$ of event pair "a", "b" for which the implication relation is to be classified.

The event layers are the same as the hidden layers of the neural network in FIG. 8. The event layers respectively calculate event embeddings $e_a$, $e_b$ which represent features of the events "a", "b", respectively, by Math. 3, using outputs from the input layers.

The temporal feature layer calculates a temporal feature $f_t(a,b)$ that represents a feature of a temporal relation {"a"$=>_t$"b"}, by Math. 5, using outputs from the event layers (extracts the temporal feature from the features of the events "a" and "b"). In Math. 5, the temporal feature $f_t(a,b)$ has dimension $h_2$, and $M_t$ is a weight matrix having dimension $h_2 \times 2h$.

$$f_t(a,b)=g(M_t[e_a,e_b]) \quad \text{[Math. 5]}$$

Similarly, the entailment feature layer calculates an entailment feature $f_e(a,b)$ that represents a feature of an entailment relation {"a"$=>_e$ "b"}, by Math. 6, using outputs from the event layers (extracts the entailment feature from the features of the events "a" and "b"). In Math. 6, the entailment feature $f_e(a,b)$ has dimension $h_2$, and $M_e$ is a weight matrix having dimension $h_{2\times2}h$.

$$f_e(a,b)=g(M_e[e_a,e_b]) \quad \text{[Math. 6]}$$

The temporal score layer calculates a temporal score $s_t(a,b)$ by Math. 7, using outputs from the temporal feature layer. In Math.7, $w_t$ is a weight vector having dimension $h_2$.

$$s_t(a,b)=w_t^T f_t(a,b) \quad \text{[Math. 7]}$$

Similarly, the entailment score layer calculates an entailment score $s_e(a,b)$ by Math. 8 using outputs from the entailment feature layer. In Math.8, $w_e$ is a weight vector having dimension $h_2$.

$$s_e(a,b)=w_e^T f_e(a,b) \quad \text{[Math. 8]}$$

The joint feature layer calculates a joint feature $f_j(a,b)$ that represents a joint feature of the temporal relation {"a"$=>_t$ "b"} and the entailment relation {"a"$=>_e$ "b"}, by Math. 9, using outputs from the temporal feature layer and the entailment feature layer (extracts the joint feature from the temporal and entailment features). In Math. 9, the joint feature $f_j(a,b)$ has dimension $h_3$, and $M_j$ is a weight matrix having dimension $h_{3 \times 2} h_2$.

$$f_j(a,b)=g(M_j[f_t(a,b),f_e(a,b)]) \quad \text{[Math. 9]}$$

The class layer calculates a class score for classifying a temporal relation, an entailment relation, or both of them, using an output from the joint feature layer. As the class score, the class layer may calculate class probabilities each representing a probability of the temporal relation, the entailment relation, or the other, by a soft-max function. Alternatively, the class layer may calculate a single class score $s_c(a,b)$ to classify the temporal relation or the entailment relation by Math. 10. In Math. 10, $w_c$ is a weight vector having dimension $h_3$.

$$s_c(a,b)=w_c^T f_j(a,b) \quad \text{[Math. 10]}$$

All layers in the neural network may be learned with standard back-propagation, and, if needed, the learning may be combined with The learning of neural network by the learning module 130 is performed in three steps shown below, for example.

Step 1) The learning module 130 learns the parameters (weight matrixes $M_a$, $M_b$) of the event layers by learning to re-construct the input (auto-encoder), as described in NPL6, for example.

Step 2) The learning module 130 learns the parameters (weight matrixes $M_t$, $M_e$) of the temporal feature layer and the entailment feature layer, independently, in such a way as to minimize the rank margin loss expressed by Math. 11 and Math. 12 below, as described in NPL5, for example. In Math. 11 and Math.12, t is a threshold value, for example "1", that is predetermined by a user, or the like. In Math. 11, $s_t(a,b)$ and $s_t(a,b')$ (b≠b') are the scores for a positive example and a negative example of event pair for a temporal relation, respectively, in the training data. The weight vector $w_t$ of the temporal score layer is jointly learned with the weight matrix $M_t$ using back-propagation. Similarly, in Math.12, $s_e(a,b)$ and $s_e(a,b')$ (b≠b') are the scores for a positive example and a negative example of event pair for an entailment relation, respectively, in the training data. The weight vector $w_e$ of the entailment score layer is jointly learned with the weight matrix $M_e$ using back-propagation. The event "b" for the negative example is, for example, randomly drawn from the training data.

$$L_{P\_t}(a,b)=\max\{0,t-s_t(a,b)+s_t(a,b')\} \quad \text{[Math. 11]}$$

$$L_{P\_e}(a,b)=\max\{0,t-s_e(a,b)+s_e(a,b')\} \quad \text{[Math. 12]}$$

While learning the temporal feature layer or the entailment feature layer, the parameters of the event layers may be left constant or may also be adjusted by back-propagation.

Step 3) The learning module 130 learns the parameters (weight matrixes $M_3$) of the joint feature layer. In a case that the single class score is calculated as the class score, for example, the weight matrixes $M_3$ of the joint feature layer is learned in such a way as to minimize the rank margin loss expressed by Math. 13, in the same way as step 2. In Math. 13, $s_c(a,b)$ and $s_c(a,b')$ (b≠b') are the scores for a positive example and a negative example of event pair, respectively, in the training data. When the single class score for classification as a temporal relation is calculated, a positive example and a negative example of event pair for the temporal relation are used. For example, for the temporal relation, {"Peter buy book"$=>_t$"Peter sell book"} is used as a positive training example, and {"Peter buy book"$=>_t$ "Peter eat book"} is used as a negative example. On the other hand, when the single class score for classification as an entailment relation is calculated, a positive example and a negative example of event pair for the entailment relation are used. The weight vector $w_c$ of the class layer is jointly learned with the weight matrix $M_3$ using back-propagation.

$$L_{P\_c}(a,b)=\max\{0,t-s_c(a,b)+s_c(a,b')\} \quad \text{[Math. 13]}$$

In a case that the class probabilities are calculated as the class score, the weight matrix $M_3$ is learned with the cross-entropy criteria.

In both cases, while learning the joint feature, the parameters of the layers learned in step 1 and step 2 may be left constant or may also be adjusted by back-propagation.

It is noted that, as a special case, the dimension $h_2$ of the temporal feature $f_t(a,b)$ and the entailment feature $f_e(a,b)$ in the event layers may be set to 1. In this case, the temporal feature $f_t(a,b)$ and the entailment feature $f_e(a,b)$ are considered as a scoring function for a temporal relation and an entailment relation, respectively, and learned using the rank margin loss as described above.

Figure 3:
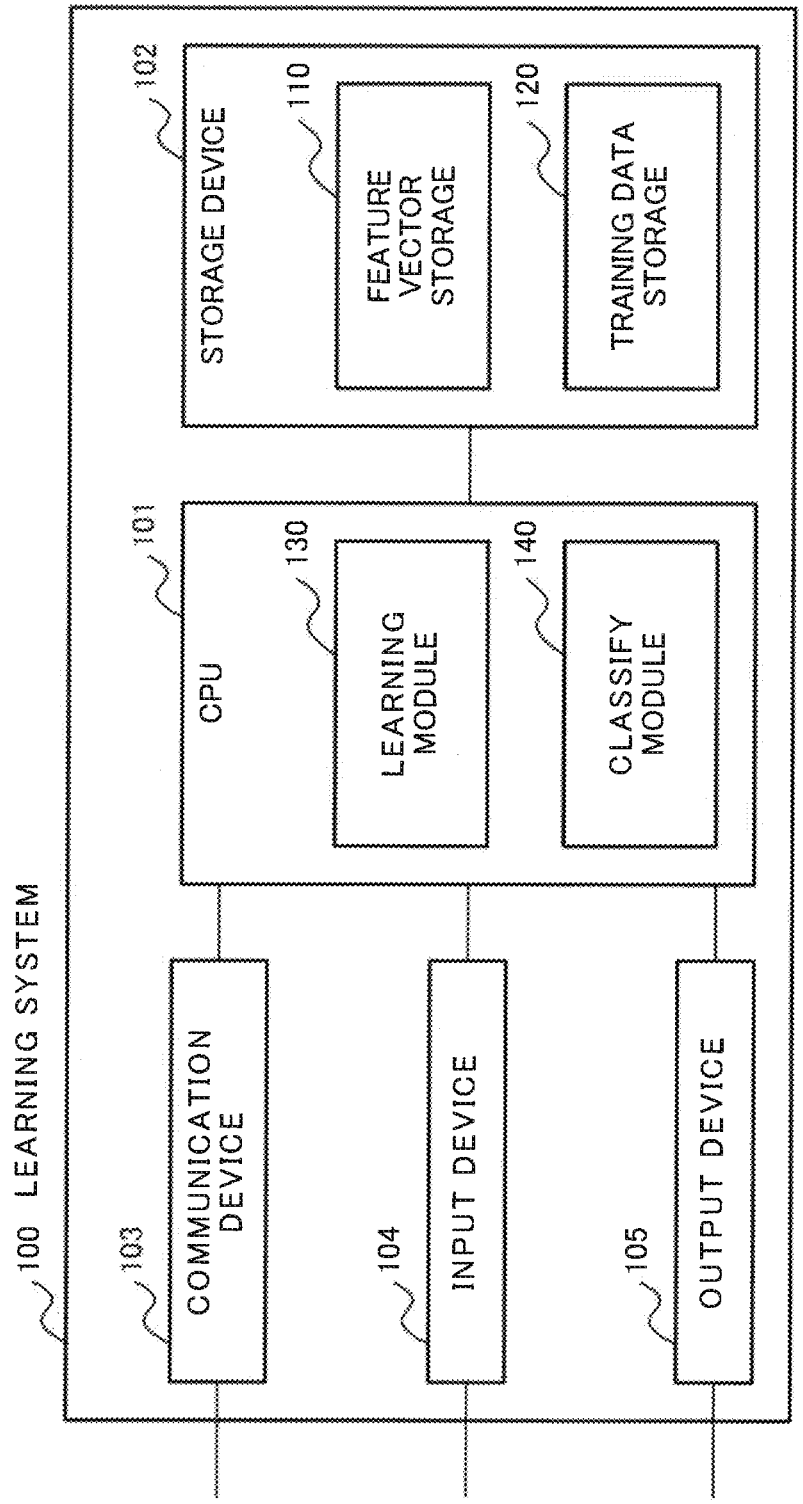
FIG. 3 is a block diagram illustrating a configuration of the learning system 100 in the first exemplary embodiment of the present invention, in the case that the learning system 100 is implemented on a computer.

The learning system 100 may be a computer which includes a central processing unit (CPU) and a storage medium storing a program and which operates according to the program-based control. FIG. 3 is a block diagram illustrating a configuration of the learning system 100 in the first exemplary embodiment of the present invention, in a case that the learning system 100 is implemented on a computer.

With reference to FIG. 3, the learning system 100 includes a CPU 101, a storage device 102 (storage medium), a communication device 103, an input device 104 such as a keyboard, and an output device 105 such as a display. The CPU 101 executes a computer program to implement the functions of the learning module 130 and the classify module 140. The storage device 102 stores information in the feature vector storage 110 and the training data storage 120. The communication device 103 may receive training data and/or test data from the other system and send a result of classification of the test data to the other system. The input device 104 may receive the training data and/or the test data from a user or the like. The output device 105 may output (display) the result of the classification to the user or the like.

The modules and storages in the learning system 100 in FIG. 3 may be allocated respectively to a plurality of devices interconnected with wired or wireless channels. A service of learning and/or classifying of the learning system 100 is provided to a user or the like as SaaS (Software as a Service).

The modules and storages in the learning system 100 in FIG. 3 may be implemented on circuitry. Here, the term "circuitry" is defined as a term conceptually including a single chip, multiple devices, a chipset, or a cloud.

Next, operations of the learning system 100 according to the first exemplary embodiment of the present invention will be described.

Figure 4:
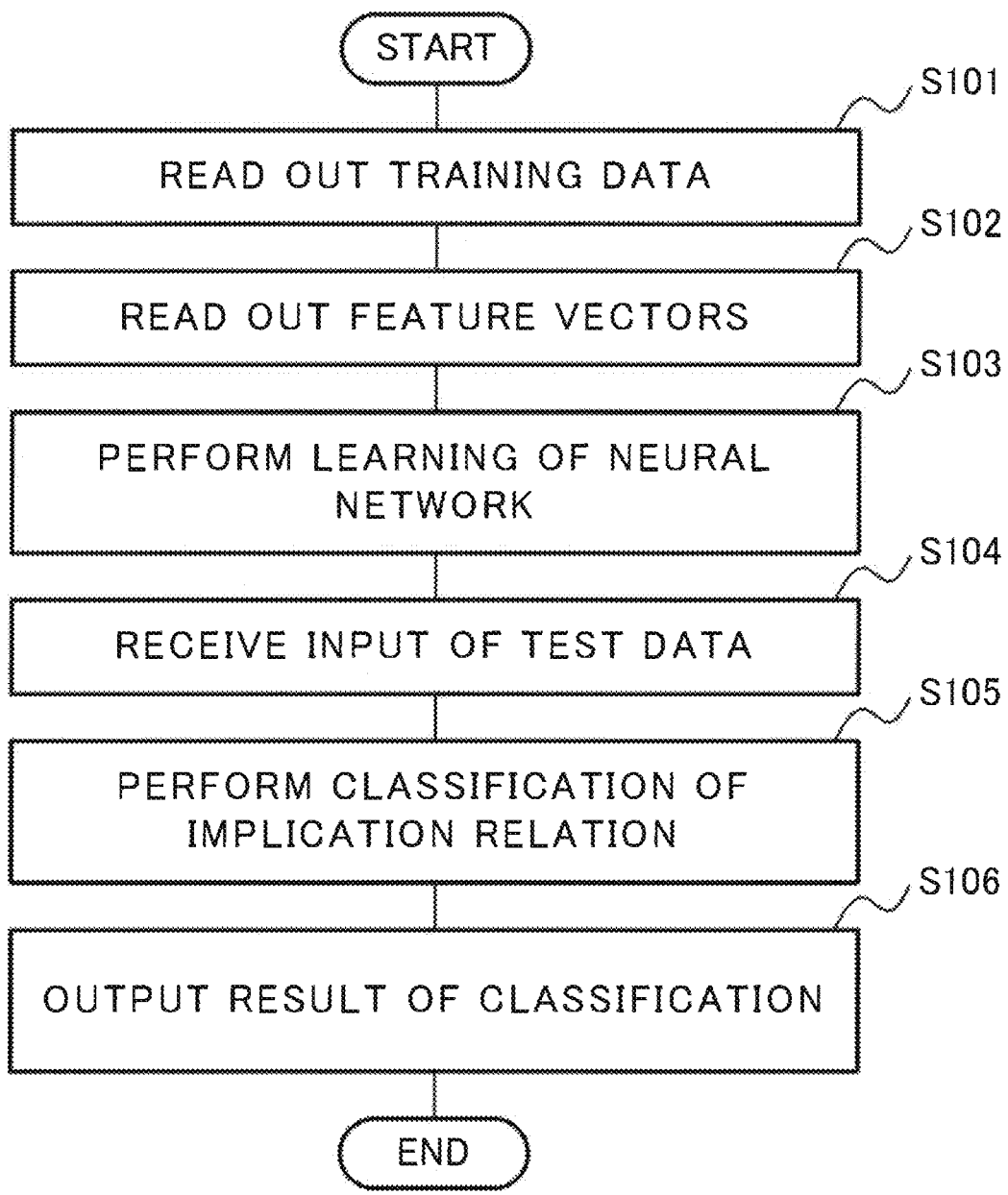
FIG. 4 is a flowchart illustrating a process of the learning system 100 in the first exemplary embodiment of the present invention.

FIG. 4 is a flowchart illustrating a process of the learning system 100 in the first exemplary embodiment of the present invention. The learning module 130 reads out pairs of events as training data from training data storage 120 (Step S101). The learning module 130 reads out feature vectors of words included in the pairs of events read out as the training data (Step S102). The learning module 130 performs learning of the parameters of the neural network for the pairs of events read out as the training data using the feature vectors (Step S103). The classify module 140 receives an input of a pair of events to be classified as test data (Step S104). The classify module 140 performs classification of an implication relation for the pair of events inputted as test data (Step S105). The classify module 140 outputs the result of the classification to a user or the like (Step S106).

Next, an example of the learning and the classifying by the learning system 100 according to the first exemplary embodiment of the present invention will be described.

It is assumed that the training data shown in FIG. 5 is stored in the training data storage 120 and feature vectors of events in the training data are stored in the feature vector storage 110.

The learning module 130 reads out the training data including a positive example for a temporal relation {(Peter, buy, car)=>$_t$ (Peter, sell, car)} and a positive example for an entailment relation {(Peter, buy, car)=>$_e$ (Peter, acquire, car)} as shown in FIG. 5 from the training data storage 120. The learning module 130 performs learning of the parameters of the neural network for the training data. Here, the learning module 130, for example, learns the neural network to output the single class score for determining whether an event pair as a temporal relation.

At test time, the classify module 140 receives, as test data, an input of event pair {(Peter, buy, car)=> (Peter, purchase, car)} to determine whether {(Peter, buy, car)=>$_t$ (Peter, purchase, car)} holds. The classify module 140 inputs the test data to the neural network learned by the learning module 130 to obtain the single class score. The classify module 140 determine whether an implication relation of the test data is classified as the temporal relation by comparing the single class score with a predetermined threshold.

Since "purchase" occurs with similar context (for example, similar subject and object) as "sell" and "acquire", word embeddings of them are similar. However, since the meaning of "purchase" is closer to the meaning of "acquire" than to "sell", the word embedding of "purchase" is closer to "acquire" than to "sell". As a consequence, the test data {(Peter, buy, car)=> (Peter, purchase, car)} is more similar to the training data having the entailment relation {(Peter, buy, car)=>$_e$ (Peter, acquire, car)} than to the training data having the temporal relation {(Peter, buy, car)=>$_t$ (Peter, sell, car)}. Therefore, the neural network outputs the single class score indicating that the implication relation of the test data is not classified to the temporal relation. The classify module 140 outputs a result of the classification, indicating that {(Peter, buy, car)=>$_t$ (Peter, purchase, car)} does not hold.

In this way, the neural network of the first exemplary embodiment of the present invention is able to leverage training data having the entailment relation to improve the classification of the temporal relation. If the test data is close to training data having the entailment relation, the test data is not classified as the temporal relation.

Next, a characteristic configuration of the first exemplary embodiment of the present invention will be described.

FIG. 1 is a block diagram illustrating a characteristic configuration of the first exemplary embodiment of the present invention.

With reference to FIG. 1, a learning system 100 includes a training data storage 120 and a learning module 130. The training data storage 120 stores a training pair of a first and second event, and a relation between the training pair of the first and second events. The relation is a first or second relation. The learning module 130 learns a neural network for classifying a relation between a pair of the first and second events to be classified as the first or second relation, by using the training pair. The neural network includes a first layer to extract a feature of the first relation from features of the first and second events, a second layer to extract a feature of the second relation from the features of the first and second events, and a joint layer to extract a joint feature of the first and second relations from the features of the first and second relations.

According to the first exemplary embodiment of the present invention, it is possible to improve detection of a relation between events. This is because the learning module 130 learns a neural network including a first layer to extract a feature of the first relation from features of the first and second events, a second layer to extract a feature of the second relation from the features of the first and second events, and a joint layer to extract a joint feature of the first and second relations from the features of the first and second relations.

Second Exemplary Embodiment

A second exemplary embodiment of the present invention will be described below. In the second exemplary embodiment of the present invention, more than two types of relations are jointly learned.

Entailment relations of verbs can be categorized into five groups: The first group is synonyms, that is word pairs where an entailment relation holds in both directions between words ("buy" and "purchase", for example). The other four groups can be defined according to NPL7, such as troponymy with temporal co-extensiveness (e.g. "limp" and "walk"), (non-troponymy with) proper temporal inclusion (e.g. "snore" and "sleep", "succeed" and "try"), backward presupposition (e.g. "tie" and "untie"), and cause (e.g. "give" and "have"). Except for the synonyms and the troponymy group, it holds that most entailment relations for one direction between words actually indicate temporal (after-before) relations for the other direction between the words.

For example, an entailment relation {"Peter snores"$=>_e$ "Peter sleeps"} indicates a temporal relation {"Peter sleeps"$=>_t$ "Peter snores"} (proper temporal inclusion). An entailment relation {"Peter unties shoes"$=>_e$ "Peter ties shoes"} indicates a temporal relation {"Peter ties shoes"$=>_t$ "Peter unties shoes"} (backward presupposition). An entailment relation {"Peter gives money"$=>_e$ "Peter has money"} indicates a temporal relation {"Peter has money"$=>_t$ "Peter gives money"} (cause).

Formally, this can be expressed by [("a"$=>_e$ "b")^¬("b"$=>_e$ "a")]$=>$["b"$=>_t$ "a"]. The left hand side of the expression means an entailment relation in which the event "a" entails the event "b", but not synonyms. In the second exemplary embodiment, the relation holding ("a"$=>_e$ "b")^¬("b"$=>_e$ "a") is defined as a proper entailment relation in order to distinguish from the other (synonyms) entailment relation holding ("a"$=>_e$ "b")^("b"$=>_e$ "a"). It is noted that the proper entailment relation is an exemplary embodiment of a third relation of the present invention.

For example, it holds that an entailment relation {(Peter, kills, Bob)$=>_e$ (Peter, wounds, Bob)} and it also holds that the temporary relation that {(Peter, wounds, Bob)$=>_t$ (Peter, kills, Bob)}.

Figure 7:
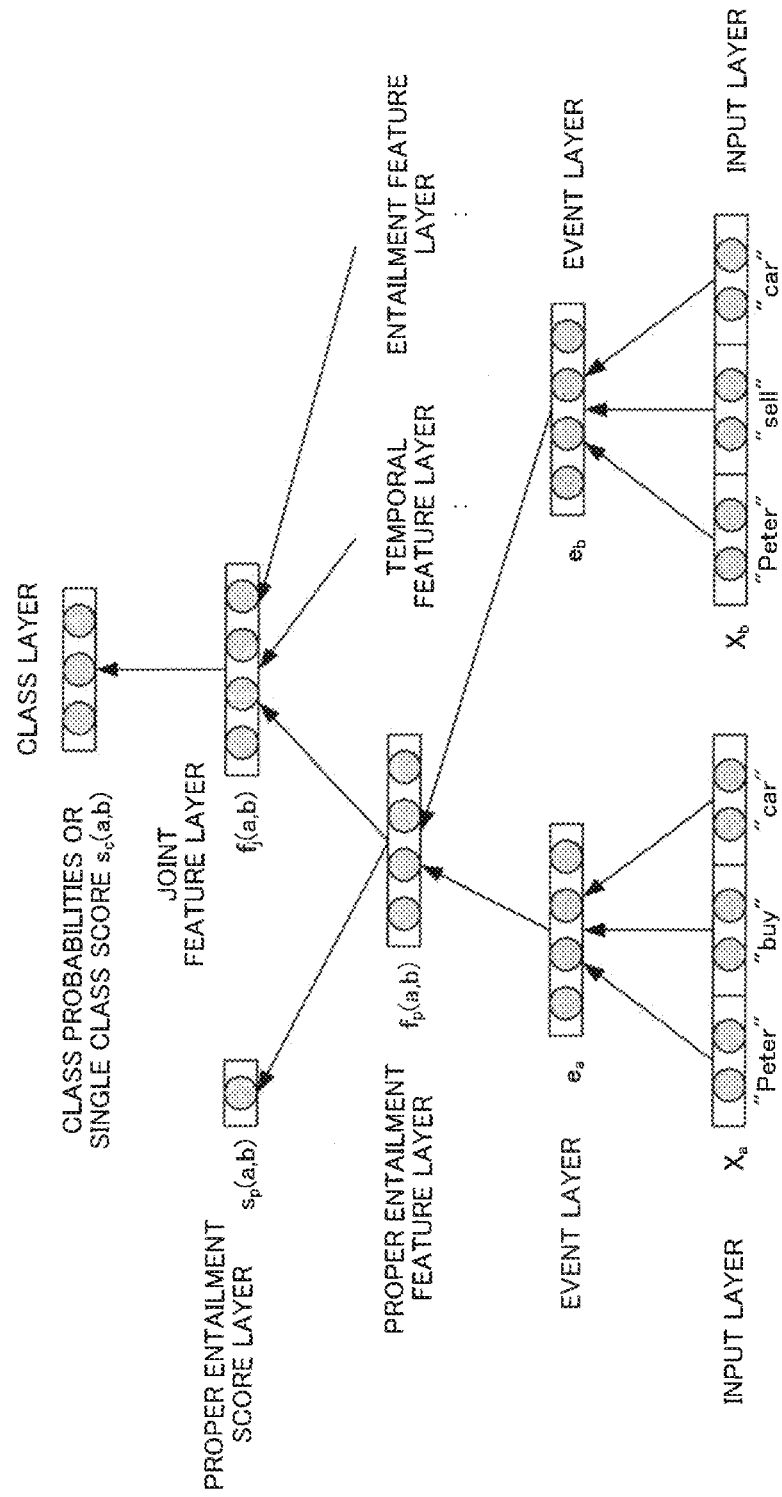
FIG. 7 is a diagram illustrating an example of a neural network in a second exemplary embodiment of the present invention.

FIG. 7 is a diagram illustrating an example of the neural network in the second exemplary embodiment of the present invention. In the neural network, in addition to similar layers of the neural network of the first exemplary embodiment, a proper entailment feature layer is defined as a feature layer. It is noted that the proper entailment feature layer is an exemplary embodiment of a third layer of the present invention.

The proper entailment feature layer calculates a proper entailment feature $f_p(a,b)$ that represents a feature of a proper entailment relation in the same manner as the other feature layers (extracts the proper entailment feature from the features of the events "a" and "b"). The joint feature layer calculates the joint feature $f_j(a,b)$ using outputs from the temporal feature layer, the entailment feature layer, and the proper entailment feature layer (extracts the joint feature from the temporal feature, the entailment feature, and the proper entailment feature). The class layer calculates a class score for classifying relation as a temporal relation, an entailment relation, or a proper entailment relation using an output from the joint feature layer.

The learning module 130 learns the parameters of the proper entailment feature layer using event pairs of a positive example for which ("a"$=>_e$ "b")^¬("b"$=>_e$ "a") holds and event pairs of a negative example for which ("a"$=>_e$ "b")^"b"$=>_e$ "a") holds, for example. On the other hand, the learning module 130 learns the (synonyms) entailment feature layer using event pairs of a positive example for which ("a"$=>_e$ "b")^("b"$=>_e$ a) holds and event pairs of a negative example for which ("a"$=>_e$ "b")^¬("b"$=>_e$ "a") holds, for example.

The learning module 130 learns the joint feature layer and the class layer using event pairs of a positive example and a negative example for a temporal relation, a (synonyms) entailment relation, or a proper entailment relation in such a way as to additionally distinguish between the (synonyms) entailment relation and the proper entailment relation.

According to the second exemplary embodiment of the present invention, it is possible to classify a relation between events as more than two types of the relation. This is because the learning module 130 learns a neural network further including a third layer to extract a feature of the third relation from the features of the first and second events, and the joint layer extracts the joint feature of the first, second, and third relations from the features of the first, second, and third relations.

Note that, in the second exemplary embodiment, the proper entailment feature layer is added as a feature layer. In the same way, other feature layers to extract other features from the features of events may be added as a feature layer. For example, a "topic feature layer" or "context feature layer" which is learned to extract topics or contexts that are common to both events in a pair of events may be added. For example, both of events "Peter plays soccer" and "Peter loves soccer" have the same topic "soccer". On the other hand, an event "Peter plays soccer" and another event "Peter plays guitar", don't share the same topic.

In this case, features like topic or context similarity can, for example, be included in a one dimensional feature layer which contains the similarity given by the inner product (or cosine similarity) between the word embeddings of predicates of events.

Furthermore, it is noted that, as another feature layer, an "antonym feature layer" to extract an antonym feature from the features of events may be added. This is because antonyms (e.g. "buy" and "sell", "untie" and "tie") can indicate that a temporal relation exists.

It is also noted that, a "language model feature" that extracts a language model feature from only one event may be added as a feature layer. In particular, the language model feature for the predicted event (second event) can measure how likely it is that the event occurs, independent of the observed event (first event). For example, for an event pair {"Peter buy book"$=>$"Peter eat book"}, the second event "Peter eat book" is unlikely to happen, and is independent of the first event. Therefore, the language model layer can find that "eat" is unlikely to have an object like "book", which as a consequence leads to a low probability for the event "Peter eat book", independent of the first event.

Further, instead of adding the proper entailment feature, the learning module 130 may learn the neural network described in the first exemplary embodiment using, as a positive example of a temporal relation, event pairs holding ["b"$=>_t$ "a"] which is obtained from event pairs holding [("a"$=>_e$ "b")^¬("b"$=>_e$ "a")] based on the above described expression [("a"$=>_e$ "b")^¬("b"$=>_e$ "a")]$=>_e$ ["b"$=>_t$ "a"].

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to a reasoning system, a clustering system, or the like, in which a relation between events, such as an entailment relation or a temporal relation is detected.

REFERENCE SIGNS LIST 100 learning system
101 CPU
102 storage device
103 communication device
104 input device
105 output device
110 feature vector storage
120 training data storage
130 learning module
140 classify module

What is claimed is:

1. An information processing system comprising:
a memory storing instructions; and
one or more processors configured to execute the instructions to:
store a training pair of a first and second event, and a first and second relation between the training pair of the first and second events, the first and second events indicated by a plurality of words; and
learn a neural network for classifying a relation between a pair of the first and second events to be classified as the first or second relation, by using the training pair, the neural network including a first layer to extract a feature of the first relation from features of the first and second events, a second layer to extract a feature of the second relation from the features of the first and second events, and a joint layer to extract a joint feature of the first and second relations from the features of the first and second relations, wherein
the first relation is a temporal relation in which the first event occurs before the second event and the second relation is an entailment relation in which the first event entails the second event.

2. The information processing system according to claim 1, wherein the feature of the first event is determined from features of words included in the first event, and the feature of the second event is determined from features of words included in the second event.

3. The information processing system according to claim 1, wherein the one or more processors configured to further execute the instructions to:
classify the relation between the pair of the first and second events to be classified as the first or second relation by using the neural network learned by the learning means.

4. The information processing system according to claim 1, wherein
the relation is any one of the first relation, the second relation, and a third relation,
the one or more processors configured to execute the instructions to:
learn the neural network for classifying the relation between the pair of the first and second events to be classified as the first, second, or third relation, by using the training pair,
the neural network further includes a third layer to extract a feature of the third relation from the features of the first and second events, and
the joint layer extracts the joint feature of the first, second, and third relations from the features of the first, second, and third relations.

5. The information processing system according to claim 4, wherein
the first relation is a temporal relation in which the first event occurs before the second event, the second relation is an entailment relation in which the first event entails the second event and the second event entails the first event, and the third relation is a proper entailment relation in which the first event entails the second event but the second event does not entail the first event.

6. An information processing method comprising:
reading out a training pair of a first and second event, and a first and second relation between the training pair of the first and second events, the first and second events indicated by a plurality of words; and
learning a neural network for classifying a relation between a pair of the first and second events to be classified as the first or second relation, by using the training pair, the neural network including a first layer to extract a feature of the first relation from features of the first and second events, a second layer to extract a feature of the second relation from the features of the first and second events, and a joint layer to extract a joint feature of the first and second relations from the features of the first and second relations, wherein
the first relation is a temporal relation in which the first event occurs before the second event and the second relation is an entailment relation in which the first event entails the second event.

7. A non-transitory computer readable storage medium recording thereon a program, causing a computer to perform a method comprising:
reading out a training pair of a first and second event, and a first and second relation between the training pair of the first and second events, the first and second events indicated by a plurality of words; and
learning a neural network for classifying a relation between a pair of the first and second events to be classified as the first or second relation, by using the training pair, the neural network including a first layer to extract a feature of the first relation from features of the first and second events, a second layer to extract a feature of the second relation from the features of the first and second events, and a joint layer to extract a joint feature of the first and second relations from the features of the first and second relations, wherein
the first relation is a temporal relation in which the first event occurs before the second event and the second relation is an entailment relation in which the first event entails the second event.

* * * * *